United States Patent Office 3,093,639
Patented June 11, 1963

---

3,093,639
2,3-DISUBSTITUTED-4-METATHIAZANONES, -1-OXIDES AND -1,1-DIOXIDES
Alexander R. Surrey, Albany, N.Y., assignor to Sterling Drug Inc., New York, N.Y., a corporation of Delaware
No Drawing. Filed July 27, 1961, Ser. No. 127,148
15 Claims. (Cl. 260—243)

This invention relates to 2-aryl-4-metathiazanones, -1-oxides and -1,1-dioxides, and is more particularly concerned with certain 3-substituted derivatives thereof and methods for the preparation of such derivatives.

Among the compounds of my invention are those of the general Formula I

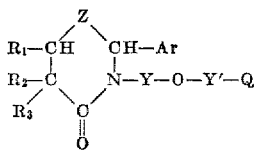

I where Z is S, SO or $SO_2$, Ar is lower-aryl, Y is polycarbon-lower-alkylene, Y' is a direct linkage or lower-alkylene, Q is lower-alkyl or monocarbocyclic-aryl, and $R_1$, $R_2$ and $R_3$ each is hydrogen or lower-alkyl. Thus, this aspect of my invention is a compound selected from the group consisting of 2-(lower-aryl)-3-[Q—Y'—O-(polycarbon-lower-alkyl)]-4-metathiazanones having up to three lower-alkyl radicals substituted in the 5- and 6- metathiazanone ring positions, and, -1-oxides and -1,1-dioxides thereof where Q and Y' are defined as above.

Also encompassed by my invention are the compounds of Formula I where Q is lower-tertiary-amino when Y' is polycarbon-lower-alkylene as defined hereinbelow.

The physical embodiments of my invention have been tested by standard pharmacological evaluation procedures and found to possess psychomotor stimulatory properties and anticonvulsant properties. These compounds have the additional advantageous property of having relatively low toxicity. The compounds where Z is S have further utility as intermediates for the preparation of my compounds where Z is SO or $SO_2$. Also, the compounds where Z is SO can be used as intermediates for the preparation of the compounds where Z is $SO_2$.

Ar in Formula I, means aromatic radicals having one or two rings each having from five to six ring-atoms, which are carbocyclic or heterocyclic, as illustrated by phenyl, naphthyl, biphenylyl, furyl, pyridyl, pyrimidyl, thiazolyl, oxazolyl, quinolyl, isoquinolyl and thienyl radicals. Preferred embodiments of my invention are compounds of the above Formula I where the lower-aryl radical designated as Ar is a monocarbocyclic-aryl radical having six ring carbon atoms, that is, an aryl radical of the benzene series. These embodiments, which are preferred primarily because of their commercial practicability due to availability of intermediates, include compounds where Ar represents the unsubstituted phenyl radical and phenyl radicals substituted by low-molecular weight substituents such as lower-alkyl, lower-alkoxy, lower-alkylmercapto, lower-alkylsulfonyl, halo, trifluoromethyl, nitro, amino, lower-alkylamino, lower-carboxylic-acylamino, phenoxy, benzyloxy, hydroxy, phenylmercapto, benzyl, 4-chlorophenoxy, and the like. The substituted phenyl radicals have preferably from one to three substituents which can be in any of the available positions of the phenyl nucleus, and where more than one substituent is present, they can be the same or different and they can be in any of the various position combinations relative to each other. The halo substituents include chloro, bromo, iodo and fluoro. The lower-alkyl, lower-alkoxy, lower-alkylmercapto, lower-alkylsulfonyl, lower-alkylamino, lower-carboxylic-acylamino, and the like substituents have preferably from one to six carbon atoms which can be methyl, ethyl, n-propyl, isobutyl, n-hexyl, methoxy, isobutyoxy, ethylmercapto, n-amylmercapto, isopropylsulfonyl, n-butylsulfonyl, ethylamino, n-butylamino, acetylamino, propionylamino, and the like.

The other lower-aryl radicals, e.g., naphthyl, biphenylyl, furyl, pyridyl, thienyl, etc., radicals, can be unsubstituted or substituted by substituents as illustrated above as substituents of the phenyl radical.

The term "lower-alkyl," e.g., as one of the meanings for Q, $R_1$, $R_2$ or $R_3$ in Formula I, as used herein, means alkyl radicals having from one to six carbon atoms and is illustrated by methyl, ethyl, n-propyl, isopropyl, n-butyl, 2-butyl, isobutyl n-amyl, isoamyl, n-hexyl, 3-hexyl and the like.

The term "polycarbon-lower-alkylene," as used herein, means alkylene radicals having from two to six carbon atoms and having its two free valence bonds, i.e., connecting linkages, on different carbon atoms and is illustrated by

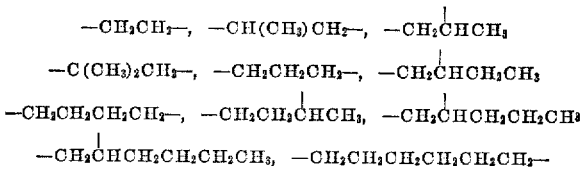

and the like.

The term "lower-alkylene," as used herein and designated as Y' in Formula I, means alkylene radicals having from one to six carbon atoms and is illustrated by —$CH_2$—, $$-\overset{|}{\text{C}}\text{HCH}_3, \quad -\overset{|}{\text{C}}\text{HCH}_2\text{CH}_3$$

—$CH_2CH_2$, —$CH_2CH_2CH_2$—, and the like, including other illustrations given above for Y.

When both Ar and Q in Formula I represent monocarbocyclic-aryl radicals, the radicals can be the same or different.

The term "lower-tertiary-amino," as used herein, means tertiary-amino radicals having two low-molecular substituents on the nitrogen atom, preferred tertiary-amino radicals being di-(lower-alkyl)amino radicals where the lower-alkyl radicals are alike or different and each alkyl radical has preferably from one to six carbon atoms, such dialkylamino radicals including dimethylamino, diethylamino, ethyl-methylamino, diisopropylamino, ethyl-n-propylamino, di-n-butylamino, di-n-hexylamino, and the like. The term "lower-tertiary-amino" also comprehends saturated N-heteromonocyclic radicals having a five to six ring atoms, illustrated by 1-piperidyl; (lower-alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2- methyl-1-pyrrolidyl, 3-ethyl-1-pyrrolidyl, 2,5-dimethyl-1-pyrrolidyl; 4-morpholinyl; 1-piperazyl; alkylated -1- piperazyl such as 4-methyl-1-piperazyl, 4-ethyl-1-piperazyl, 2,4,6-trimethyl-1-piperazyl; and the like.

The compounds of Formula I where Z is S are prepared preferably by heating a beta-mercaptopropionic acid, $HS-CH(R_1)C(R_2)(R_3)COOH$, with a lower-aryl aldehyde, ArCHO, in the presence of an amine of the formula $Q-Y'-O-Y-NH_2$. The reaction is carried out using a temperature range of about 65° C. to about 110° C. The reaction probably takes place in three steps which may be illustrated diagrammatically as follows:

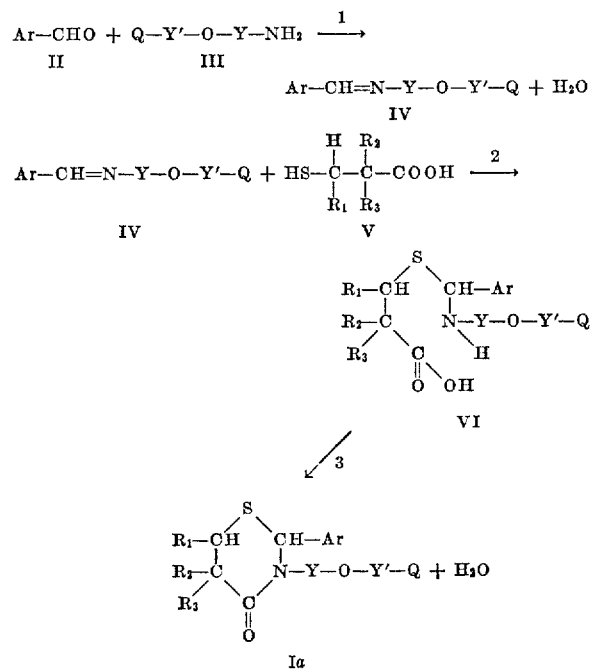

Thus, in the first step (1) the lower-aryl aldehyde (II) is condensed with the amine (III) to yield an azomethine (IV) plus water. In the second step (2) the beta-mercaptopropionic acid (V) adds to the carbon-nitrogen double bond of the azomethine (IV) to yield the aminomethylcarcaptopropionic acid derivative (VI) which cyclizes in the third step (3) to yield the desired 2-(lower-aryl)-4-metathiazanone (Ia) plus a second molecule of water. The process is usually carried out without isolating the intermediate azomethine (IV) or the aminomethylmercaptopropionic acid derivative (VI). Since two molar equivalents of water (one in each of steps 1 and 3 are formed for every mole of metathiazanone (Ia) produced, the extent of condensation (in step 1) and cyclization (in step 3) can be followed and the reaction time ascertained by carrying out the procedure in an inert, non-polar solvent such as benzene and collecting the water in a continuous separator connected to the apparatus. The procedure is carried out preferably in refluxing benzene until no more water is collected. Illustrative of the process of my invention is the preparation of 2 - (4 - chlorophenyl) - 3-(2-methoxyethyl)-4-metathiazanone using 4-chlorobenzaldehyde, 2-methoxyethylamine and beta-mercaptopropionic acid as reactants.

The above procedure, while being the preferred method of preparing my 2-(lower-aryl)-3-(Q—Y'—O—Y)-4-metathiazones, can be modified, but with no particular advantage. For example, the preparation can be run at lower temperatures down to about room temperature but the reaction time required is longer; or it can be carried out without a solvent or using other solvents such as toluene, ethanol, isopropanol, n-hexane, and the like.

The 2 - (lower - aryl) - 3 - (Q—Y'—O—Y)-4-metathiazanone-1-oxides (Formula I where Z is SO) of my invention are prepared by oxidizing the corresponding 2-(lower - aryl) - 3 - (Q—Y'—O—Y)-4-metathiazanones. This oxidation is carried out by reacting the metathiazanone with an oxidizing agent effective to oxidize sulfides to sulfoxides. Various oxidative procedures can be employed, but the one preferred in practicing my invention comprises using a per-organic acid, e.g., peracetic acid, in a suitable solvent e.g., ethyl acetate. The reaction is exothermic and is carried out preferably by mixing the reactants preferably at a low temperature, i.e., from 0° C. to 10° C. Other oxidizing agents that can be used are other per-organic acids, e.g., perbenzoic acid.

The 2-(lower-aryl)-3-(O—Y'—O—Y) - 4 - metathiazanone-1,1-dioxides of my invention (Formula I where Z is $SO_2$) are prepared by oxidizing the corresponding metathiazanones (Formula I where Z is S). This oxidation is carried out by reacting the metathiazanone with an oxidizing agent effective to oxidize sulfides to sulfones. Various oxidative procedures can be employed, but the one preferred in practicing my invention comprises using potassium permanganate in aqueous acetic acid solution. Other oxidizing agents that can be used include hydrogen peroxide, chromium trioxide ($CrO_3$), and the like. Also, the oxidation can be carried out using an excess of a per-organic acid, e.g., peracetic acid, at about room temperature (20–25° C.) for several days. Alternatively, the 2-(lower-aryl)-3-(Q—Y'—O—Y)-4 - metathiazanone-1,1-dioxides can be prepared by oxidizing the corresponding 1-oxides (Formula I where Z is SO), using these same oxidizing agents effective to oxidize sulfides to sulfones, e.g., potassium permanganate, hydrogen peroxides, etc.

The chemical structures of my 2-(lower-aryl)-3-(Q—Y'—O—Y)-4-metathiazanones and corresponding-1-oxides and -1,1-dioxides are established by the mode of their syntheses and corroborated by the correspondence of calculated and found values for the elementary analyses for representative examples.

The following examples will further illustrate specific embodiments of the invention without, however, limiting it thereto.

*Example 1*

2-(4-chlorophenyl)-3-(2-methoxyethyl) - 4 - metathiazanone was prepared as follows: A solution containing 14.1 g. of 4-chlorobenzaldehyde, 11.5 g. of 65% 2-methoxyethylamine solution and 125 cc. of benzene was refluxed for 90 minutes with a continuous separator connected to the reaction vessel for removal of water formed by the reaction (and water of the methoxyethylamine solution). After this heating period, 5.5 cc. of water had been collected. Then 11.6 g. of β-mercaptopropionic acid was added to the reaction mixture and refluxing was continued for 18 hours. The total quantity of water collected was not ascertained because of a leak in the continuous separator. To the reaction mixture was added more benzene and the resulting mixture was poured into dilute aqueous ammonium hydroxide solution and the mixture shaken well. The benzene layer was separated, washed with water, dried over anhydrous calcium sulfate, and evaporated in vacuo to remove the benzene. The remaining oily material was distilled in vacuo to yield 6.0 g. of the product, 2-(4-chlorophenyl)-3-(2 - methoxyethyl)-4-metathiazanone, a yellow viscous oil, B.P. 150–157° C. at 0.130 mm.

*Analysis.*—Calcd. for $C_{13}H_{16}ClNO_2S$: Cl, 12.41; S, 11.22. Found: Cl, 12.16; S, 11.07.

Following the foregoing procedure using 26.2 g. of 3,4-dichlorobenzaldehyde, 13.4 g. of 3-methoxypropylamine, 200 cc. of benzene, and 17.8 g. of β-mercaptopropionic acid and reflux periods of 1 hour before the addition of the acid and 20 hours after addition of the acid, there was obtained 13.4 g. of the product, 2-(3,4-dichlorophenyl)-3-(3 - methoxypropyl) - 4 - metathiazanone, B.P. 150–158° C. at 0.015 mm. This yellow viscous oily product crystallized on standing and 6.7 g. of it was recrystallized twice from n-heptane to yield 4.6 g. of colorless solid product, M.P. 95.4–96.6° C. (corr.).

*Analysis.*—Calcd. for $C_{14}H_{17}Cl_2NO_2S$: Cl, 21.21; S, 9.59. Found: Cl, 21.58; S, 9.52.

Example 2

3-(2-methoxyethyl)-2 - phenyl - 4 - metathiazanone was prepared by refluxing for 23 hours a mixture containing 10.6 g. of benzaldehyde, 11.5 g. of 65% aqueous 2-methoxyethylamine solution, 11.6 g. of β-mercaptopropionic acid and 125 cc. of benzene with a continuous separator connected to the reaction vessel for removal of water. At the end of the reflux period, a total of 6.2 cc. of water had been collected. More benzene was added to the reaction mixture which was then poured into dilute ammonium hydroxide solution and the resulting mixture was shaken well and the layers separated. The benzene layer was washed with water, dried over anhydrous calcium sulfate and evaporated in vacuo to remove the benzene. There was thus obtained 22.6 g. of a yellow oily product which crystallized on standing. Recrystallization of the product from n-heptane yielded 14.3 g. of the product, M.P. 67–71° C. For analysis, a 4.2 g. portion was recrystallized a second time from n-heptane and dried at 40° C. and 25 mm. for three days to yield 3.1 g. of the product, 3-(2-methoxyethyl)-2-phenyl-4-metathiazanone, colorless crystals, M.P. 72.0–73.0° C. (corr.).

*Analysis.*—Calcd. for $C_{13}H_{17}NO_2S$: N, 5.57; S, 12.75. Found: N, 5.63; S, 12.73.

Following the procedure described in Example 2 using molar equivalent quantities of the appropriate araldehyde, alkoxyalkylamine and β-mercaptopropionic acid, the following 2-aryl-3-alkoxyalkyl-4-metathiazanones were prepared: 2 - (2,4-dichlorophenyl) - 3 - (2 - methoxyethyl)-4-metathiazanone, B.P. 134–149° C. at 0.003 mm., using 2,4-dichlorobenzaldehyde, 2-methoxyethylamine and β-mercaptopropionic acid; 3-(2-methoxyethyl)-2-(4-methoxyphenyl)-4-metathiazanone, B.P. 137–145° C. at 0.006 mm., using 4-methoxybenzaldehyde, 2-methoxyethylamine and β-mercaptopropionic acid; 2-(4-chlorophenyl)-3-(2-ethoxyethyl)-4-metathiazanone, B.P. 127–144° C. at 0.006 mm., using 4-chlorobenzaldehyde, 2-ethoxyethylamine and β-mercaptopropionic acid; 3-(2-methoxyethyl)-2-(4-methylphenyl)-4-metathiazanone, a yellow viscous oil which changed to a waxy solid on standing, B.P. 113–126° C. at 0.004 mm., using 4-methylbenzaldehyde, 2-methoxyethylamine and β-mercaptopropionic acid; 2-(3,4-dichlorophenyl)-3-(2-methoxyethyl) - 4 - metathiazanone, M.P. 58.0–59.6° C. (corr.), using 3,4-dichlorobenzaldehyde, 2-methoxyethylamine and β-mercaptopropionic acid; 2-(2-chlorophenyl)-3-(2-methoxyethyl)-4-metathiazanone, B.P. 115–125° C. at 0.003 mm., using 2-chlorobenzaldehyde, 2-methoxyethylamine and β-mercaptopropionic acid; 2-(3-chlorophenyl)-3-(2-methoxyethyl)-4-metathiazanone, B.P. 132–135° C. at 0.015 mm., using 3-chlorobenzaldehyde, 2-methoxyethylamine and β-mercaptopropionic acid; 2-(4-chlorophenyl)-3-(3-methoxypropyl)-4-metathiazanone, B.P. 140–148° C. at 0.011 mm., using 4-chlorobenzaldehyde, 3-methoxypropylamine and β-mercaptopropionic acid; 3-(2-methoxyethyl)-2-(4-nitrophenyl)-4-metathiazanone, M.P. 99.2–100.8° C. (corr.) using 4-nitrobenzaldehyde, 2-methoxyethylamine and β-mercaptopropionic acid; 3-(2-methoxyethyl)-2-[4-(4-nitrophenoxy)phenyl]-4-metathiazanone, M.P. 113.0–114.8° C. (corr.), using 4-(4-nitrophenoxy)benzaldehyde, 2-methoxyethylamine and β-mercaptopropionic acid; and, 2-(3,4-dimethylphenyl)-3-(2-methoxyethyl)-4 - metathiazanone, B.P. 140–141° C. at 0.010 mm., using 3,4-dimethylbenzaldehyde, 2-methoxyethylamine and β-mercaptopropionic acid.

Following the procedure described in Example 2 and using molar equivalent quantities of the appropriate reactants, the following compounds can be prepared: 3-(2-methoxypropyl)-2-(2-methylphenyl) - 4 - metathiazanone using 2-methylbenzaldehyde, 2-methoxypropylamine and β-mercaptopropionic acid; 3-(2-isopropoxyethyl)-2-(4-isopropylphenyl)-4-metathiazanone using 4-isopropylbenzaldehyde, 2-isopropoxyethylamine and β-mercaptopropionic acid; 3 - (2 - n - butoxyethyl)-2-(4-iodophenyl)-4-metathiazanone using 4-iodobenzaldehyde, 2-n-butoxyethylamine and β-mercaptopropionic acid; 2-(3-bromophenyl)-3-(2-n-hexoxyethyl)-4-metathiazanone using 3-bromobenzaldehyde, 2-n-hexoxyethylamine and β-mercaptopropionic acid; 3-(4-methoxybutyl)-2-(2,4,6-trichlorophenyl)-4-metathiazanone using 2,4,6-trichlorobenzaldehyde, 4-methoxybutylamine and β-mercaptopropionic acid; 3-(6-ethoxyhexyl)-2-(4-methoxyphenyl)-4-metathiazanone using 4-methoxybenzaldehyde, 6-ethoxyhexylamine and β-mercaptopropionic acid; 2-(3-ethoxyphenyl)-3-(3-n-propoxypropyl)-4-metathiazanone using 3-ethoxybenzaldehyde, 3-n-propoxypropylamine and β-mercaptopropionic acid; 2 - (3,4 - dimethoxyphenyl)-3-(3-ethoxypropyl)-4-metathiazanone using 3,4-dimethoxybenzaldehyde, 3-ethoxypropylamine and β-mercaptopropionic acid; 2-(3-chloro-4-methoxyphenyl)-3-(2-methoxyethyl)-4-metathiazanone using 3-chloro-4-methoxybenzaldehyde, 2-methoxyethylamine and β-mercaptopropionic acid; 3-(2-ethoxybutyl) - 2 - (4-n-propylmercaptophenyl)-4-metathiazanone using 4-n-propylmercaptobenzaldehyde, 2-ethoxybutylamine and β-mercaptopropionic acid; 2-(4-n-butylsulfonylphenyl)-3-(2-methoxyethyl) - 4 - metathiazanone using 4-n-butylsulfonylbenzaldehyde, 2-methoxyethylamine and β-mercaptopropionic acid; 3-(2-ethoxyethyl)-2-(3-trifluoromethylphenyl)-4 - metathiazanone using 3-trifluoromethylbenzaldehyde, 2-ethoxyethylamine and β-mercaptopropionic acid; 2-(4-acetylaminophenyl)-3-(3-methoxypropyl)-4-metathiazanone using 4-acetylaminobenzaldehyde, 3-methoxypropylamine and β-mercaptopropionic acid; 2-(4-aminophenyl)-3-(2-methoxyethyl)-4-metathiazanone is prepared preferably by reacting the corresponding 3-(2-methoxyethyl)-2-(4-nitrophenyl)-4-metathiazanone with a reducing agent effective to reduce nitro groups to amino groups, e.g., iron and HCl; 2 - (4 - n-butylaminophenyl)-3-(2-methoxyethyl)-4-metathiazanone using 4-n-butylaminobenzaldehyde, 2-methoxyethylamine and β-mercaptopropionic acid; 3-(2-ethoxyethyl)-2-(4-phenoxyphenyl)-4-metathiazanone using 4-phenoxybenzaldehyde, 2-ethoxyethylamine and β-mercaptopropionic acid; 2 - (3-benzyloxyphenyl)-3-(3-ethoxypropyl)-4-metathiazanone using 3-benzyloxybenzaldehyde, 3-ethoxypropylamine and β-mercaptopropionic acid; 2-(2-hydroxyphenyl)-3-(2-methoxyethyl)-4-metathiazanone using 2-hydroxybenzaldehyde, 2-methoxyethylamine and β-mercaptopropionic acid; 3-(2-methoxyethyl)-2-(4-phenylmercaptophenyl)-4-metathiazanone using 4-phenylmercapto benzaldehyde, 2-methoxyethylamine and β-mercaptopropionic acid; 2 - (3 - benzylphenyl)-3-(2-methoxyethyl)-4-metathiazanone using 3-benzylbenzaldehyde, 2-methoxyethylamine and β-mercaptopropionic acid; 2-[4-(4-chlorophenoxy)phenyl]-3-(3-ethoxypropyl)-4-metathiazanone using 4-(4-chlorophenoxy)benzaldehyde, 3-ethoxypropylamine and β-mercaptopropionic acid; 3 - (2-methoxyethyl)-5-methyl-2-(2-naphthyl)-4-metathiazanone using 2-naphthaldehyde, 2-methoxyethylamine and α-methyl-β-mercaptopropionic acid; 3-(2-benzyloxyethyl)-2-(4-biphenylyl)-4-metathiazanone using 4-biphenylcarboxaldehyde, 2-benzyloxyethylamine and β-mercaptopropionic acid; 2-(2-furyl)-3-(2-methoxyethyl)-4-metathiazanone using 2-furancarboxaldehyde, 2-methoxyethylamine and β-mercaptopropionic acid; 3-(2-methoxyethyl)-2-(3-pyridyl)-4-metathiazanone using 3-pyridinecarboxaldehyde, 2-methoxyethylamine and β-mercaptopropionic acid; 5-ethyl-3-[2-(2-phenylethoxy)ethyl]-2-(4-pyridyl)-4-metathiazanone using 4-pyridinecarboxaldehyde, 2-(2-phenylethoxy)ethylamine and α-ethyl-β-mercaptopropionic acid; 3-[2-(4-chlorobenzyloxy)ethyl]-2-(3-thienyl)-4-metathiazanone using 3-thiophenecarboxaldehyde, 2-(4-chlorobenzyloxy)ethylamine and β-mercaptopropionic acid; 5,5-dimethyl-3-(2-methoxyethyl)-2-(2-thienyl)-4-metathiazanone using 2-thiophenecarboxaldehyde, 2-methoxyethylamine and α,α-dimethyl-β-mercaptopropionic acid; 2-(2-ethoxy-1-naphthyl)-3-(2-phenoxyethyl)-4-metathiazanone using 2-ethoxy-1-naphthaldehyde, 2-phenoxyethylamine and β-mercaptopropionic acid; 3 - [2 - (3,4 - dichlorophenoxy)ethyl] - 2-(5-nitro-2-furyl)-4-metathiazanone using 5-nitro-2-furancarboxaldehyde, 2-(3,4-dichlorophenoxy)-ethylamine and β-mercaptopropionic acid; 2-(5-chloro-3-pyridyl)-3-(2-methoxyethyl)-4-metathiazanone using 5-chloro-3-pyridinecarboxaldehyde, 2-methoxyethylamine and β-mercaptopropionic acid; 5,5-diethyl-3-[2-(4-methoxyphenoxy)ethyl]-2-(3,4,5-tribromo-2-thienyl) - 4 - metathiazanone using 3,4,5-tribromo - 2 - thiophenecarboxaldehyde, 2 - (4 - methoxyphenoxy)ethylamine and α,α-diethyl-β-mercaptopropionic acid; 3 - (2-methoxyethyl)-2-(5-pyrimidyl)-4-metathiazanone using 5-pyrimidinecarboxaldehyde, 2-methoxyethylamine and β-mercaptopropionic acid; 3-[2-(4-phenylbutoxy)ethyl]-2-(4-thiazolyl)-4-metathiazanone using 4-thiazolecarboxaldehyde, 2 - (4-phenylbutoxy)ethylamine and β-mercaptopropionic acid; 3-{2-[2-(4-chlorophenyl)-ethoxy]ethyl}-2-(4-oxazolyl)-4-metathiazanone using 4-oxazolecarboxaldehyde, 2-[2-(4-chlorophenyl)ethoxy]ethylamine and β-mercaptopropionic acid; 2-(3,4-dichlorophenyl)-3-(2-methoxyethyl) - 5-methyl-4-metathiazanone using 3,4-dichlorobenzaldehyde, 2-methoxyethylamine and α-methyl-β-mercaptopropionic acid; 3-(2-methoxyethyl)-2-(3-quinolyl)-4-metathiazanone using 3-quinolinecarboxaldehyde, 2-methoxyethylamine and β-mercaptopropionic acid; 2-(3,4-dichlorophenyl)-3-(2-methoxyethyl)-5-n-propyl-4-metathiazanone using 3,4-dichlorobenzaldehyde, 2-methoxyethylamine and α-n-propyl-β-mercaptopropionic acid; 3-(2-methoxyethyl)-2-(3,4,5-trimethoxyphenyl)-4-metathiazanone using 3,4,5-trimethoxybenzylaldehyde, 2-methoxyethylamine and β-mercaptopropionic acid; 2-(3-isoquinolyl)-3-(2-methoxyethyl)-4-metathiazanone using 3-isoquinolinecarboxaldehyde, 2-methoxyethylamine and β-mercaptopropionic acid; 2-(3,4-dichlorophenyl)-3-(2-methoxyethyl)-5,5,6-trimethyl-4-metathiazanone using 3,4-dichlorobenzaldehyde, 2-methoxyethylamine and α,α-dimethyl-β-mercaptobutyric acid; 2-(3-chlorophenyl)-5-ethyl-6-isopropyl-3-(2-methoxyethyl)-4-metathiazanone using 3,4-dichlorobenzaldehyde, 2-methoxyethylamine and α-ethyl-β-mercapto-γ-methylvaleric acid; 2-(2,4-dichlorophenyl)-6-ethyl-3-(2-methoxyethyl)-5-n-propyl-4-metathiazanone using 2,4-dichlorobenzaldehyde, 2-methoxyethylamine and β-mercapto-α-n-propylvaleric acid; 2-(4-chlorophenyl)-5-isopropyl-3-(2-methoxyethyl)-6-methyl-4-metathiazanone using 4-chlorobenzaldehyde, 2-methoxyethylamine and α-isopropyl-β-mercaptobutyric acid; 2 - (3,4 - dichlorophenyl) - 3 - (2-methoxyethyl)-6-methyl-4-metathiazanone using 3,4-dichlorobenzaldehyde, 2-methoxyethylamine and β-mercaptobutyric acid; 5 - ethyl - 3-(2-methoxyethyl)-2-phenyl-6-n-propyl-4-metathiazanone using benzaldehyde, 2-methoxyethylamine and α-ethyl-β-mercaptocaproic acid; and, 2-(3,4 - dichlorophenyl) - 5,6 - dimethyl - 3 - (2 - methoxyethyl)-4-metathiazanone using 3,4-dichlorobenzaldehyde, 2-methoxyethylamine and α-methyl-β-mercaptobutyric acid.

Example 3

2-(3,4-dichlorophenyl)-3-(2-ethoxyethyl)-4-metathiazanone was prepared as follows: A mixture of 26.2 g. of 3,4-dichlorobenzaldehyde and a solution of 13.4 g. of 2-ethoxyethylamine in about 247 cc. of methanol was refluxed for 3 and ½ hours, concentrated in vacuo, 200 cc. of benzene was added and the resulting solution dried azeotropically by removing some of the benzene by distillation. To the benzene solution was added 17.8 g. of β-mercaptopropionic acid and the resulting mixture was refluxed for 22 hours with a continuous separator connected to the reaction vessel for removal of water. At the end of the reflux period, a total of 2.4 cc. of water had been collected. The reaction mixture was poured into dilute aqueous ammonium hydroxide solution; the resulting mixture shaken well; the benzene layer separated and washed twice with water, dried over anhydrous calcium sulfate and evaporated by distilling in vacuo to yield 40.2 g. of red oily material which crystallized on standing. The crystalline material was recrystallized twice from n-heptane using decolorizing charcoal to yield 26.1 g. of the product, 2-(3,4-dichlorophenyl)-3-(2-ethoxyethyl)-4-metathiazanone, a yellow powder, M.P. 57–65° C. For analysis, a 6.0 g. portion of the product was first recrystallized from methanol-water. It was then dissolved in benzene and the benzene solution was treated as follows: washed successively with 10% aqueous sodium bisulfite solution, 10% aqueous potassium carbonate solution, aqueous ammonium chloride solution and water; dried over anhydrous calcium sulfate; concentrated by distilling in vacuo; and diluted with n-heptane. The crystalline solid that separated on standing was collected and dried at 40° C. and 20 mm. for 20 hours to yield 2.3 g. of the purified product, a colorless solid, M.P. 64.4–66.0° C. (corr.).

*Analysis.*—Calcd. for $C_{14}H_{17}Cl_2NO_2S$: N, 4.19; S., 9.59. Found: N, 4.13; S, 9.67.

Example 4

3-(2-methoxyethyl)-2-phenyl-4-metathiazanone-1-oxide was prepared as follows: Solutions containing 5.0 g. of 3-(2-methoxyethyl)-2-phenyl-4-metathiazanone in 35 cc. of benzene and 3.9 g. of 40% peracetic acid in 35 cc. of ethyl acetate were both cooled to 5° C. and the latter solution was added to the former with swirling. The temperature rose rapidly to 24° C. and then slowly subsided to about 7° C. as the reaction mixture was cooled in an ice bath. The reaction mixture was washed twice with aqueous sodium bisulfite solution and twice with water, dried over anhydrous calcium sulfate and concentrated in vacuo to yield 3.5 g. of oily material which crystallized. The crystalline material was recrystallized from ethyl acetate and dried at 50° C. and 20 mm. for 18 hours to yield 2.1 g. of the product, 3-(2-methoxyethyl)-2-phenyl-4-metathiazanone-1-oxide, colorless crystals, M.P. 133.8–134.6° C. (corr.).

*Analysis.*—Calcd. for $C_{13}H_{17}NO_3S$: N, 5.24; S, 11.99. Found: N, 5.27; S, 11.97.

Following the procedure described in Example 4 using molar equivalent quantities of the corresponding 2-aryl-3-alkoxyalkyl-4-metathiazanone and peracetic acid, the following 2-aryl-3-alkoxyalkyl-4-metathiazanone-1-oxides were prepared: 2-(3,4-dichlorophenyl)-3-(2-methoxyethyl)-4-metathiazanone-1-oxide, M.P. 116.8-117.6° C. (corr.); 2-(2,4-dichlorophenyl) - 3 - (2-methoxyethyl)-4-metathiazanone-1-oxide, M.P. 103.4–104.2° C. (corr.); 2 - (2 - chlorophenyl) - 3 - (2-methoxyethyl)-4-metathiazanone-1-oxide, M.P. 52.2–53.4° C. (corr.); 3-(2-methoxyethyl)-2-(4-methylphenyl) - 4 - metathiazanone-1-oxide, M.P. 56.4–58.6° C. (corr.); 2-(3-chlorophenyl)-3-(2-methoxyethyl)-4-metathiazanone-1-oxide, M.P. 106.2–108.0° C. (corr.); 2-(4-chlorophenyl)-3-(2-methoxyethyl)-4-metathiazanone-1-oxide, M.P. 76.4–78.4° C. (corr.); 2-(3,4-dichlorophenyl)-3-(3 - methoxypropyl)-4-metathiazanone-1-oxide, M.P. 114.0–115.6° C. (corr.); 2-(3,4-dichlorophenyl)-3-(2 - ethoxyethyl) - 4 - metathiazanone-1-oxide, a yellow viscous oil; 3-(2-methoxyethyl)-2-[4-(4-nitrophenoxy)phenyl] - 4 - metathiazanone-1-oxide, M.P. 128.0–129.2° C. (corr.); 2-(3,4-dimethylphenyl)-3-(2-methoxyethyl)-4-metathiazanone-1-oxide, a yellow viscous oil; and 3-(2-methoxyethyl)-2-(4-nitrophenyl)4-metathiazanone-1-oxide, M.P. 140.2–141.0° C. (corr.).

Following the procedure described in Example 4 and using molar equivalent quantities of the corresponding 2-aryl-3-substituted-4-metathiazanone and peracetic acid, the following compounds can be prepared:

3-(2-methoxypropyl)-2-(2-methylphenyl)-4-metathiazanone-1-oxide,
3-(2-isopropoxyethyl)-2-(4-isopropylphenyl)-4-metathiazanone-1-oxide, 3-(2-n-butoxyethyl)-2-(4-iodophenyl)-4-metathiazanone-1-oxide,
2-(3-bromophenyl)-3-(2-n-hexoxyethyl)-4-metathiazanone-1-oxide,
3-(4-methoxybutyl)-2-(2,4,6-trichlorophenyl)-4-metathiazanone-1-oxide,
3-(6-ethoxyhexyl)-2-(4-methoxyphenyl)-4-metathiazanone-1-oxide,
2-(3-ethoxyphenyl)-3-(3-n-propoxypropyl)-4-metathiazanone-1-oxide,
2-(3,4-dimethoxyphenyl)-3-(3-ethoxypropyl)-4-metathiazanone-1-oxide,
2-(3-chloro-4-methoxyphenyl)-3-(2-methoxyethyl)-4-metathiazanone-1-oxide,
3-(2-ethoxybutyl)-2-(4-n-propylmercaptophenyl)-4-metathiazanone-1-oxide,
2-(4-n-butylsulfonylphenyl)-3-(2-methoxyethyl)-4-metathiazanone-1-oxide,
3-(2-ethoxyethyl)-2-(3-trifluoromethylphenyl)-4-metathiazanone-1-oxide,
2-(4-acetylaminophenyl)-3-(3-methoxypropyl)-4-metathiazanone-1-oxide,
2-(4-aminophenyl)-3-(2-methoxyethyl)-4-metathiazanone-1-oxide,
2-(4-n-butylaminophenyl)-3-(2-methoxyethyl)-4-metathiazanone-1-oxide,
3-(2-ethoxyethyl)-2-(4-phenoxyphenyl)-4-metathiazanone-1-oxide,
2-(3-benzyloxyphenyl)-3-(3-ethoxypropyl)-4-metathiazanone-1-oxide,
2-(2-hydroxyphenyl)-3-(2-methoxyethyl)-4-metathiazanone-1-oxide,
3-(2-methoxyethyl)-2-(4-phenylmercaptophenyl)-4-metathiazanone-1-oxide,
2-(3-benzylphenyl)-3-(2-methoxyethyl)-4-metathiazanone-1-oxide, 2-[4-(4-chlorophenoxy)phenyl]-3-(3-ethoxypropyl)-4-metathiazanone-1-oxide,
3-(2-methoxyethyl)-5-methyl-2-(2-naphthyl)-4-metathiazanone-1-oxide,
3-(2-benzyloxyethyl)-2-(4-biphenylyl)-4-metathiazanone-1-oxide,
2-(2-furyl)-3-(2-methoxyethyl)-4-metathiazanone-1-oxide,
3-(2-methoxyethyl)-2-(3-pyridyl)-4-metathiazanone-1-oxide,
5-ethyl-3-[2-(2-phenylethoxy)ethyl]-2-(4-pyridyl)-4-metathiazanone-1-oxide,
3-[2-(4-chlorobenzyloxy)ethyl]-2-(3-thienyl)-4-metathiazanone-1-oxide,
5,5-dimethyl-3-(2-methoxyethyl)-2-(2-thienyl)-4-metathiazanone-1-oxide,
2-(2-ethoxy-1-naphthyl)-3-(2-phenoxyethyl)-4-metathiazanone-1-oxide,
3-[2-(3,4-dichlorophenoxy)ethyl]-2-(5-nitro-2-furyl)-4-metathiazanone-1-oxide,
2-(5-chloro-3-pyridyl)-3-(2-methoxyethyl)-4-metathiazanone-1-oxide,
5,5-diethyl-3-[2-(4-methoxyphenoxy)ethyl]-2-(3,4,5-tribromo-2-thienyl)-4-metathiazanone-1-oxide,
3-(2-methoxyethyl)-2-(5-pyrimidyl)-4-metathiazanone-1-oxide,
3-[2-(4-phenylbutoxy)ethyl]-2-(4-thiazolyl)-4-metathiazanone-1-oxide,
3-{2-[2-(4-chlorophenyl)ethoxy]ethyl}-2-(4-oxazolyl)-4-metathiazanone-1-oxide,
2-(3,4-dichlorophenyl)-3-(2-methoxyethyl)-5-methyl-4-metathiazanone-1-oxide,
3-(2-methoxyethyl)-2-(3-quinolyl)-4-metathiazanone-1-oxide,
2-(3,4-dichlorophenyl)-3-(2-methoxyethyl)-5-n-propyl-4-metathiazanone-1-oxide,
3-(2-methoxyethyl)-2-(3,4,5-trimethoxyphenyl)-4-metathiazanone-1-oxide,
2-(3-isoquinolyl)-3-(2-methoxyethyl)-4-metathiazanone-1-oxide,
2-(3,4-dichlorophenyl)-3-(2-methoxyethyl)-5,5,6-trimethyl-4-metathiazanone-1-oxide,
2-(3-chlorophenyl)-5-ethyl-6-isopropyl-3-(2-methoxyethyl)-4-metathiazanone-1-oxide,
2-(2,4-dichlorophenyl)-6-ethyl-3-(2-methoxyethyl)-5-n-propyl-4-metathiazanone-1-oxide,
2-(4-chlorophenyl)-5-isopropyl-3-(2-methoxyethyl)-6-methyl-4-metathiazanone-1-oxide,
2-(3,4-dichlorophenyl)-3-(2-methoxyethyl)-6-methyl-4-metathiazanone-1-oxide,
5-ethyl-3-(2-methoxyethyl)-2-phenyl-6-n-propyl-4-metathiazanone-1-oxide,
and 2-(3,4-dichlorophenyl)-5,6-dimethyl-3-(2-methoxyethyl)-4-metathiazanone-1-oxide.

*Example 5*

2-(4-chlorophenyl)-3-(2 - methoxyethyl)-4-metathiazanone-1,1-dioxide was prepared as follows: To a stirred solution of 12 g. of 2-(4-chlorophenyl)-3-(2-methoxyethyl)-4-metathiazanone in 40 cc. of acetic acid kept between 20–25° C. was added dropwise with stirring a solution of 12 g. of potassium permanganate in 120 cc. of water. The reaction mixture was then decolorized by adding a solution of aqueous sodium bisulfite solution and the resulting mixture was stirred with cooling for a period of 30 minutes. The precipitated tan powdery material was collected and recrystallized from isopropyl alcohol using decolorizing charcoal and then dried at 80° C. for 20 hours to yield 8.2 g. (62%) of the product, 2-(4-chlorophenyl)-3-(2 - methoxyethyl)-4-metathiazanone-1,1-dioxide, colorless crystals, M.P. 137.2–137.8° C. (corr.).

*Analysis.*—Calcd. for $C_{13}H_{16}ClNO_4S$: Cl, 11.16; S, 10.09. Found: Cl, 11.29; S, 9.93.

Following the procedure described in Example 5 using molar equivalent quantities of the corresponding 2-aryl-3-alkoxyalkyl-4-metathiazanone and potassium permanganate, the following 2-aryl-3-alkoxyalkyl-4-metathiazanone-1,1-dioxides were prepared: 2-(3,4-dichlorophenyl)-3-(2 - methoxyethyl)-4-metathiazanone-1,1-dioxide, M.P. 151.2–152.0° C. (corr.); 3-(2-methoxyethyl)-2-phenyl-4-metathiazanone - 1,1 - dioxide, M.P. 120.6–122.0° C. (corr.); 2-(4-chlorophenyl) - 3 - (2-ethoxyethyl)-4-metathiazanone-1,1-dioxide, M.P. 120.6–121.4° C. (corr.); 2-(2,4-dichlorophenyl)-3-(2 - methoxyethyl)-4-metathiazanone-1,1-dioxide, M.P. 154.4–155.2° C. (corr.); 3-(2-methoxyethyl)-2-(4 - methoxyphenyl)-4-metathiazanone-1,1-dioxide, M.P. 126.6–127.2° C. (corr.); 3-(2-methoxyethyl)-2-(4-methylphenyl) - 4 - metathiazanone - 1,1 - dioxide, M.P. 122.4–123.6° C. (corr.); 2-(2-chlorophenyl)-3-(2 - methoxyethyl)-4-metathiazanone-1,1-dioxide, M.P. 65–66.2° C. (corr.); 2-(3-chlorophenyl)-3-(2-methoxyethyl)-4-metathiazanone-1,1-dioxide, M.P. 143.2–145.6° C. (corr.); 2-(3,4-dichlorophenyl)-3-(2-ethoxyethyl)-4-metathiazanone - 1,1 - dioxide, M.P. 106.0–107.6° C. (corr.); 2-(3,4-dichlorophenyl)-3-(3 - methoxypropyl)-4-metathiazanone - 1,1 - dioxide, M.P. 117.4–118.4° C. (corr.); 3-(2-methoxyethyl) - 2 - (4-nitrophenyl)-4-metathiazanone-1,1-dioxide, M.P. 146.8–148.0° C. (corr.); 3-(2 - methoxyethyl)-2-[4 - (4 - nitrophenoxy)phenyl]-4-metathiazanone - 1,1 - dioxide, M.P. 150.2–152.0° C. (corr.); and, 2-(3,4-dimethylphenyl)-3-(2-ethyl)-4-metathiazanone-1,1-dioxide, M.P. 88.4–91.4° C. (corr.); 3-(2-methoxyethyl)-2-phenyl-4-metathiazanone - 1,1 - dioxide, M.P. 120.6–122.0° C. (corr.); and, 3-(2-methoxyethyl)-2-(4 - methylphenyl)-4-metathiazanone-1,1-dioxide, M.P. 122.4–123.6° C. (corr.).

Following the procedure described in Example 5 and using molar equivalent quantities of the corresponding 2 - aryl - 3 - substituted-4-metathiazanone and potassium permanganate, the following compounds can be prepared: 3 - (2-methoxypropyl)-2-(2-methylphenyl)-4-metathiazanone-1,1-dioxide, 3-(2 - isopropoxyethyl)-2-(4-isopropylphenyl)-4-metathiazanone-1,1-dioxide, 3 - (2-n-butoxyethyl)-2-(4-iodophenyl)-4-metathiazanone-1,1-dioxide, 2-

(3-bromophenyl)-3-(2-n-hexoxyethyl) - 4 - metathiazanone-1,1-dioxide, 3-(4-methoxybutyl)-2-(2,4,6-trichlorophenyl) - 4 - metathiazanone-1,1-dioxide, 3 - (6-ethoxyhexyl)-2-(4-methoxyphenyl-4-metathiazanone - 1,1 - dioxide, 2-(3-ethoxyphenyl) - 3 - (3-n-propoxypropyl) - 4-metathiazanone-1,1-dioxide, 2-(3,4-dimethoxyphenyl)-3-(3-ethoxypropyl)-4-metathiazanone - 1,1-dioxide, 2 - (3-chloro-4-methoxyphenyl)-3-(2-methoxyethyl) - 4 - metathiazanone-1,1-dioxide, 3-(2-ethoxybutyl)-2-(4-n-propylmercoptophenyl)-4-metathiazanone-1,1-dioxide, 2-(4-n-butylsulfonylphenyl)-3-(2 - methoxyethyl)-4-metathiazanone-1,1-dioxide, 3-(2-ethoxyethyl)-2-(3-trifluoromethylphenyl)-4-metathiazanone-1,1-dioxide, 2-(4-acetylaminophenyl)-3-(3-methoxypropyl)-4-metathiazanone-1,1 - dioxide, 2 - (4-aminophenyl)-3-(2-methoxyethyl)-4-metathiazanone-1,1-dioxide, 2 - (4-butylaminophenyl)-3-(2-methoxyethyl)-4-metathiazanone-1,1-dioxide, 3 - (2-ethoxyethyl-2-(4-phenoxyphenyl)-4-metathiazanone-1,1 - dioxide, 2 - (3 - benzyloxyphenyl)-3-(3-ethoxypropyl)-4-metathiazanone-1,1-dioxide, 2 - (2-hydroxyphenyl)-3-(2-methoxyethyl)-4-metathiazanone-1,1-dioxide, 3-(2-methoxyethyl)-2-(4-phenylmercaptophenyl - 4 - metathiazanone-1,1-dioxide, 2-(3-benzylphenyl) - 3 - (2-methoxyethyl)-4-metathiazanone-1,1-dioxide, 2-[4-(4-chlorophenoxy)phenyl]-3-(3-ethoxypropyl - 4 - metathiazanone-1,1-dioxide, 3-(2-methoxyethyl)-5-methyl-2-(2-naphthyl)-4-metathiazanone - 1,1 - dioxide, 3-(2-benzyloxyethyl) - 2-(4-biphenylyl)-4-metathiazanone-1,1-dioxide, 2-(2-furyl)-3-(2-methoxyethyl)-4-metathiazanone-1,1 - dioxide, 3-(2-methoxyethyl)-2-(3-pyridyl)-4-metathiazanone - 1,1 - dioxide, 5-ethyl - 3-[2-(2-phenylethoxy)ethyl-2-(4-pyridyl)-4-metathiazanone-1,1 - dioxide, 3 - [2-(4-chlorobenzyloxy)ethyl]-2-(3-thienyl) - 4 - metathiazanone-1,1-dioxide, 5,5-dimethyl-3-(2-methoxyethyl) - 2 - (thienyl)-4-metathiazanone-1,1-dioxide, 2 - (2-ethoxy-1-naphthyl)-3-(2-phenoxyethyl-(4-metathiazanone - 1,1-dioxide, 3-[2-(3,4-dichlorophenoxy)ethyl]-2-(5 - nitro-2-furyl) - 4 - metathiazanone-1,1 - dioxide, 2 - (5 - chloro-3-pyridyl)-3-(2-methoxyethyl) - 4-metathiazanone-1,1-dioxide, 5,5 - diethyl-3-[2-(4-methoxyphenoxy)ethyl]-2 - (3,4,5-tribromo-2-thienyl)-4-metathiazanone-1,1-dioxide, 3 - (2 - methoxyethyl) - 2 - (5-pyrimidyl)-4-metathiazanone - 1,1-dioxide, 3-[2-(4-phenylbutoxy)ethyl] - 2 - (4-thiazolyl)-4-metathiazanone - 1,1 - dioxide, 3-{2-[2-(4-chlorophenyl)ethoxy]-ethyl} - 2 - (4-oxazolyl)-4-metathiazanone-1,1-dioxide, 2-(3,4-dichlorophenyl) - 3 - (2-methoxyethyl)-5-methyl - 4 - metathiazanone-1,1-dioxide, 3-(2-methoxyethyl) - 2 - (3-quinolyl)-4-metathiazanone-1,1-dioxide, 2-(3,4-dichlorophenyl) - 3 - (2-methoxyethyl)-5-n-propyl-4-metathiazanone - 1,1 - dioxide, 3-(2-methoxyethyl)-2-(3,4,5-trimethoxyphenyl) - 4 - metathiazanone-1,1-dioxide,2-(3-isoquinolyl)-3-(2-methoxyethyl) - 4 - metathiazanone - 1,1 - dioxide, 2-(3,4-dichlorophenyl)-3-(2-methoxyethyl)-5,5,6-trimethyl - 4 - metathiazanone-1,1-dioxide, 2-(3-chlorophenyl)-5-ethyl-6-isopropyl - 3 - (2-methoxyethyl-4-metathiazanone - 1,1 - dioxide, 2-(2,4-dichlorophenyl)-6-ethyl - 3 - (2-methoxyethyl) - 5 - n-propyl-4-metathiazanone - 1,1 - dioxide, 2-(4-chlorophenyl)-5-isopropyl-3-(2-methoxyethyl) - 6 - methyl-4-metathiazanone-1,1-dioxide, 2-(3,4-dichlorophenyl) - 3 - (2-methoxyethyl)-6-methyl-4-metathiazanone - 1,1 - dioxide, 5-ethyl-3-3-(2-methoxyethyl)-2-phenyl-6-n-propyl - 4-metathiazanone-1,1-dioxide, and 2-(3,4-dichlorophenyl)-5,6-dimethyl-3-(2-methoxyethyl)-4-metathiazanone-1,1-dioxide.

*Example 6*

2-(3,4-dichlorophenyl)-3-(2-phenoxyethyl) - 4 - (metathiazanone was prepared by refluxing a solution containing 17.4 g. of 3,4-dichlorobenzaldehyde, 72.5 cc of 2-phenoxyethylamine and 30 cc. of benzene with a continuous separator connected to the reaction vessel for removal of water formed by the reaction. After a heating period of about 2 hours, 2.5 cc. of water had been collected. To the reaction mixture was then added 10.6 g. of β-mercaptopropionic acid and refluxing was continued for about 48 hours, after which an additional 2.0 cc. of water had been collected. To the reaction mixture was added more benzene and the resulting solution, kept warm, was poured into dilute aqueous ammonium hydroxide solution and the mixture shaken well. The benzene layer was separated, washed three times with water and distilled in vacuo to remove the benzene. The resulting oily material crystallized and was then recrystallized from ethanol to yield 23 g. of the product, 2-(3,4-dichlorophenyl)-3-(2 - phenoxyethyl)-4-metathiazanone, a colorless solid, M.P. 146.6–148.0° C. (corr.).

*Analysis.*—Calcd. for $C_{18}H_{17}Cl_2NO_2S$: Cl, 18.55; S, 8.39. Found: Cl,18.83; S, 8.43.

Following the procedure described in Example 6 using molar equivalent quantities of the appropriate araldehyde, 2-phenoxyethylamine and β-mercaptopropionic acid, there was obtained: 2-(4-chlorophenyl)-3-(2-phenoxyethyl)-4-metathiazanone, M.P. 118.4–120–0° C. (corr.), using 4-chlorobenzaldehyde; and 2 - (2 - dichlorophenyl)-3-(2-phenoxyethyl)-4-metathiazanone, M.P. 101.0–102.6° C. using 2,4-dichlorobenzaldehyde.

2-(3,4-dichlorophenyl)-3-(2-phenoxyethyl) - 4 - metathiazanone-1-oxide, M.P.150.0–151.6° C. (corr.), was prepared following the procedure described in Example 4 using 8.0 g. of 2-(3,4-dichlorophenyl - 3 - (2-phenoxyethyl)-4-metathiazanone and 6.0 g. of 40% peracetic acid.

2-(4-chlorophenyl)-3-(2 - phenoxyethyl)-4-metathiazanone-1-oxide, M.P. 115.0–116.4° C. (corr.), was prepared following the procedure described in Example 4 using 9.0 g. of 2-(4-chlorophenyl)-3-(2-phenoxyethyl-4-metathiazanone and 7.43 g. of 40% peracetic acid.

2-(3,4-dichlorophenyl - 3 - (2-phenoxyethyl)-4-metathiazanone-1,1-dioxide, M.P. 164.2–165.4° C. (corr.), was prepared following the procedure described in Example 5 using 8.0 g. of 2-(3,4-dichlorophenyl)-3-(2-phenoxyethyl)-4-metathiazanone and 4.8 g. of potassium permanganate.

2-(4-chlorophenyl) - 3 - (2-phenoxyethyl-4-metathiazanone-1,1-dioxide, M.P. 118.8–119.6° C. (corr.), was prepared following the procedure described in Example 5 using 9.0 g. of 2-(4-chlorophenyl)-3-(2-phenoxyethyl)-4-metathiazanone and 5.95 g. of potassium permanganate.

*Example 7*

2 - (3,4 - dichlorophenyl) - 3 - (3 - dimethylaminoethoxypropyl-4-metathiazanone was prepared by refluxing a solution containing 22.8 g. of 3,4-dichlorobenzaldehyde, 19.3 g. of 3-dimethylaminoethoxypropylamine and 100 cc. benzene with a continuous separator connected to the reaction vessel for removal of water formed by the reaction. After a heating period of about 4 hours, 2.1 cc. of water had been collected. To the cooled reaction mixture was added 7.8 g. of acetic acid and 14.7 g. of β-mercaptopropionic acid and refluxing was continued for 11 days, after which time an additional 4.3 cc. of water had been collected. The reaction mixture was cooled, poured into dilute aqueous ammonium hydroxide solution and the mixture shaken well. The benzene layer was separated, washed twice with water and distilled in vacuo to remove the benzene. The resulting oily material was dissolved in hot isopropyl alcohol; decolorizing charcoal added to the hot solution; the mixture filtered; the filtrate acidified with a solution of hydrogen chloride in ethanol; and the resulting solution cooled to yield a crystalline product. The solid product was collected, recrystallized from isopropyl alcohol and dried at 90° C. for 2 days to yield 6.6 g. of the product, 2-(3,4-dichlorophenyl) - 3 - (3 - dimethylaminoethoxypropyl) - 4 - metathiazanone in the form of its hydrochloride, M.P. 177.0–178.2° C. (corr.).

*Analysis.*—Calcd. for $C_{17}H_{24}Cl_2N_2O_2S \cdot HCl$: N, 6.55; S, 7.50. Found: N, 6.33; S, 7.33.

2 - (3,4 - dichlorophenyl) - 3 - (3 - dimethylaminoethoxypropyl)-4-metathiazanone in free base form is obtained by dissolving a sample of the above-described dihydrochloride in water, treating the aqueous solution with excess aqueous sodium hydroxide solution, extracting the liberated base with benzene, drying the benzene extract with anhydrous sodium sulfate, and removing the benzene by distillation in vacuo, thereby yielding said compound in the form of its free base.

My compounds of Formula I, as illustrated by the foregoing examples, are of particular interest because they possess psychomotor stimulatory properties, exhibit anticonvulsant activity and have low toxicity. When administered orally to mice using a modified procedure of the photocell activity cage method of Dews [Brit. J. Pharmacol., 8, 46 (1953)], they were found to have psychomotor stimulatory properties at dose levels of about 25 to 400 mg. per kg. of body weight. For example, the following compounds produced marked stimulation at doses of about 200 mg. per kg.:

2-(2,4-dichlorophenyl)-3-(2-methoxyethyl)-4-metathiazanone,
2-(3,4-dichlorophenyl)-3-(2-methoxyethyl)-4-metathiazanone,
2-(3-chlorophenyl)-3-(2-methoxyethyl)-4-metathiazanone,
2-(3,4-dichlorophenyl)-3-(3-methoxypropyl)-4-metathiazanone,
3-(2-methoxyethyl)-2-phenyl-4-metathiazanone-1-oxide,
2-(3,4-dichlorophenyl)-3-(2-methoxyethyl)-4-metathiazanone-1-oxide,
2-(2,4-dichlorophenyl)-3-(2-methoxyethyl)-4-metathiazanone-1,1-dioxide,
2-(2-chlorophenyl)-3-(2-methoxyethyl)-4-metathiazanone-1,1-dioxide,
2-(3-chlorophenyl)-3-(2-methoxyethyl)-4-metathiazanone-1-oxide,
2-(4-chlorophenyl)-3-(2-methoxyethyl)-4-metathiazanone-1-oxide
and 2-(3,4-dichlorophenyl)-3-(3-dimethylaminoethoxypropyl)-4-metathiazanone hydrochloride.

The compounds of my invention protect against maximal electroshock convulsions when tested intraperitoneally by standard procedures in mice, e.g., to protect 50% of the animals against maximal electroshock, the calculated doses ($PD_{50}$) of 3-(2-methoxyethyl)-2-phenyl-4-metathiazanone, 2-(3,4-dichlorophenyl)-3-(2-methoxyethyl)-4-metathiazanone, 2-(3,4-dichlorophenyl)-3-(2-methoxyethyl)-4-metathiazanone-1-oxide and 2-(2,4-dichlorophenyl)-3-(2-methoxyethyl)-4-metathiazanone - 1 - oxide are, respectively, 152±10.2, 114±8.9, 177±8.7 and 209±14.5 mg. per kg.

As illustrative of the low toxicities of my compounds, the following compounds were found to have approximate acute oral toxicities ($ALD_{50}$) in mice in the range of about 1250 to greater than 4000 mg. per kg.:

2-(3,4-dichlorophenyl)-3-(2-methoxyethyl)-4-metathiazanone,
2-(3,4-dichlorophenyl)-3-(3-methoxypropyl)-4-metathiazanone,
2-(3-chlorophenyl)-3-(2-methoxyethyl)-4-metathiazanone,
3-(2-methoxyethyl)-2-phenyl-4-metathiazanone-1-oxide,
2-(3-chlorphenyl)-3-(2-methoxyethyl)-4-metathiazanone-1-oxide,
2-(3,4-dichlorophenyl)-3-(2-methoxyethyl)-4-metathiazanone-1-oxide,
2-(2-chlorophenyl)-3-(2-methoxyethyl)-4-metathiazanone-1,1-dioxide
and 2-(2,4-dichlorophenyl)-3-(2-methoxyethyl)-4-metathiazanone-1,1-dioxide.

I claim:
1. A compound of the formula

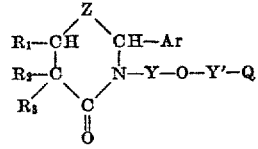

where Z is a member selected from the group consisting of S, SO and $SO_2$, Ar is a member of the group consisting of phenyl, naphthyl, biphenylyl, furyl, pyridyl, pyrimidyl, thiazolyl, oxazolyl, quinolyl, isoquinolyl and thienyl radicals and such radicals substituted by one to three substituents selected from the group consisting of lower-alkyl, lower-alkoxy, lower-alkylmercapto, lower-alkylsulfonyl, halo, trifluoromethyl, nitro, amino, lower-alkylamino, lower-carboxylic-acylamino, phenoxy, benzyloxy, hydroxy, phenylmercapto, benzyl and 4-chlorophenoxy, Y is alkylene having from two to six carbon atoms and having its connecting linkages on different carbon atoms, Y' is a member selected from the group consisting of a direct linkage and lower-alkylene, Q is a member selected from the group consisting of lower-alkyl and monocarbocyclic-aryl, and $R_1$, $R_2$ and $R_3$ each is selected from the group consisting of hydrogen and lower-alkyl.

2. 3-[(lower-alkoxy)-Y] - 2 - (monocarbocyclic-aryl)-4-metathiazanone where Y is alkylene having from two to six carbon atoms and having its connecting linkages on different carbon atoms.

3. 3-[(lower-alkoxy)-Y] - 2 - (monocarbocyclic-aryl)-4-metathiazanone-1-oxide where Y is alkylene having from two to six carbon atoms and having its connecting linkages on different carbon atoms.

4. 3 - [(lower-alkoxy)-Y]-2-(monocarbocyclic-aryl)-4-metathiazanone-1,1-dioxide where Y is alkylene having from two to six carbon atoms and having its connecting linkages on different carbon atoms.

5. 2-(2,4-dichlorophenyl)-3-(2 - methoxyethyl)-4-metathiazanone.

6. 2-(3,4-dichlorophenyl)-3-(2 - methoxyethyl)-4-metathiazanone.

7. 2-(3-chlorophenyl)-3-(2 - methoxyethyl)-4-metathiazanone.

8. 2-(3,4-dichlorophenyl) - 3 - (3 - methoxypropyl)-4-metathiazanone.

9. 3-(2-methoxyethyl) - 2 - phenyl-4-metathiazanone-1-oxide.

10. 2-(3,4-dichlorophenyl) - 3 - (2 - methoxyethyl)-4-metathiazanone-1-oxide.

11. 2-(2,4-dichlorophenyl) - 3 - (2 - methoxyethyl)-4-methathiazanone-1,1-dioxide.

12. 2-(2-chlorophenyl) - 3 - (2-methoxyethyl)-4-metathiazanone-1,1-dioxide.

13. 2-(3-chlorophenyl) - 3 - (2-methoxyethyl)-4-metathiazanone-1-oxide.

14. 2-(4-chlorophenyl) - 3 - (2-methoxyethyl)-4-metathiazanone-1-oxide.

15. 2-(3,4-dichlorophenyl)-3-(3-dimethylaminoethoxypropyl)-4-metathiazanone.

References Cited in the file of this patent
FOREIGN PATENTS
815,203   Great Britain _____ June 17, 1959

UNITED STATES PATENT OFFICE
CERTIFICATE OF CORRECTION

Patent No. 3,093,639                     June 11, 1963

Alexander R. Surrey

It is hereby certified that error appears in the above numbered patent requiring correction and that the said Letters Patent should read as corrected below.

Column 2, line 34, for "-CH$_2$$\overset{|}{\text{C}}$HCH$_2$CH$_2$CH3" read -- CH$_2$$\overset{|}{\text{C}}$HCH$_2$CH$_2$CH$_3$ --; line 60, strike out -- a --; column 3, line 46, for "methylcarcaptopropionic" read -- methylmercaptopropionic --; column 4, line 12, for "-(O-Y'-O-Y)-" read -- -(Q-Y'-O-Y)- --; column 8, line 65, for "phenyl)4-" read -- -- phenyl)-4- --; column 11, line 4, for "-(4-methoxyphenyl-" read -- -(4-methoxyphenyl)- --; line 10, for "mercoptophenyl)- read -- mercaptophenyl)- --; line 22, for "-(4-phenylmercaptophenyl-" read -- -(4-phenylmercaptophenyl)- --; line 25, for "-(3-ethoxypropyl-" read -- -(3-ethoxypropyl)- --; same column 11, line 31, for "-(2-phenylethoxy)ethyl-2-" read -- -(phenylethoxy)ethyl]-2- --; line 34, for "-2-(thienyl)-" read -- -2-(2-thienyl)- --; line 36, for "phenoxyethyl-(4-" read -- phenoxyethyl)-4- --; line 52, for "ide,2-" read -- ide, 2- --; line 56, for "oxyethyl-4-" read -- oxyethyl)-4- --; line 62, for "3-3-(2-" read -- 3-(2- --; same column 11, line 69, for "72.5 cc" read -- 72.5 cc. --; column 12, line 19, for "2-(2-" read -- 2-(2,4- --; line 25, for "-(3,4-dichlorophenyl-3-" read -- -(3,4-dichlorophenyl)-3- --; line 31, for "-(2-phenoxyethyl-4-" read ---(2-phenoxyethyl)-4- --; line 33, for "2-(3,4-dichlorophenyl-3-" read -- 2-(3,4-dichlorophenyl)-3- --; line 39, for "-(2-phenoxyethyl-4-" read -- -(2-phenoxyethyl)-4- --; same column 12, line 48, for "ethoxypropyl-4-" read -- ethoxypropyl)-4- --; column 13, line 65, for "2-(3-chlorphenyl)-" read -- 2-(3-chlorophenyl)- --.

Signed and sealed this 24th day of December 1963.

(SEAL)
Attest:
ERNEST W. SWIDER

Attesting Officer

EDWIN L. REYNOLDS
Acting Commissioner of Patents